(No Model.)
C. M. RICHMOND.
ARTIFICIAL DENTURE.
No. 277,936. Patented May 22, 1883.
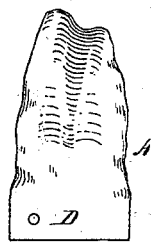
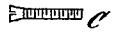
ATTEST:
J. A. Murdle
William Paxton
C. M. Richmond
INVENTOR:
By Charles E. Foster
Atty

UNITED STATES PATENT OFFICE.

CASSIUS M. RICHMOND, OF NEW YORK, N. Y., ASSIGNOR TO THE RICHMOND TOOTH CROWN COMPANY, OF SAME PLACE.

ARTIFICIAL DENTURE.

SPECIFICATION forming part of Letters Patent No. 277,936, dated May 22, 1883.

Application filed January 8, 1883. (No model.)

*To all whom it may concern:*

Be it known that I, CASSIUS M. RICHMOND, of the city, county, and State of New York, have invented a new and useful Improvement in Artificial Dentures, of which the following is a full, true, and exact description, reference being had to the accompanying drawing.

This invention relates to a method of attaching an inclosing-cap to a root or tooth by means of a screw or pin projecting laterally through the cap and into the root.

My invention will be readily understood from the accompanying drawing, in which A represents a prepared tooth; B, the cap to be applied thereto, and C the screw to be used to hold the same together. The root A is first properly prepared and shaped to receive the metallic cap or support B. As shown, B is shaped to correspond with the form of a tooth-crown. The cap being placed in position upon the root, a hole is laterally drilled, as shown at D, through the cap and into the root, and the pin or screw is then driven or placed in situation in said holes, so as to lock the cap and root firmly together. This method of attaching a cap to a root prevents the longitudinal withdrawal of the cap from the root without splitting the root, while by the methods heretofore in use, if the cement within the cavity in any way lost its hold, the cap became liable to be longitudinally withdrawn from the root.

What I claim as my invention, and desire to secure by Letters Patent, is—

The combination of a root and a hermetically-closed cap placed over and inclosing the end of said root or tooth, and a screw passing through the cap and root and projecting substantially at right angles to the major axis of the tooth, substantially as described.

CASSIUS M. RICHMOND.

Witnesses:
OTTO BAUMANN,
WILLIAM PAXTON.